(12) United States Patent
Sinha et al.

(10) Patent No.: US 10,963,388 B2
(45) Date of Patent: Mar. 30, 2021

(54) PREFETCHING IN A LOWER LEVEL EXCLUSIVE CACHE HIERARCHY

(71) Applicant: Samsung Electronics Co., Ltd., Suwon-si (KR)

(72) Inventors: Vikas Sinha, Austin, TX (US); Teik Tan, Austin, TX (US); Tarun Nakra, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 38 days.

(21) Appl. No.: 16/543,503

(22) Filed: Aug. 16, 2019

(65) Prior Publication Data

US 2020/0401523 A1    Dec. 24, 2020

Related U.S. Application Data

(60) Provisional application No. 62/865,954, filed on Jun. 24, 2019.

(51) Int. Cl.
*G06F 12/08* (2016.01)
*G06F 12/0862* (2016.01)
*G06F 12/0811* (2016.01)
*G06F 13/40* (2006.01)

(52) U.S. Cl.
CPC ...... *G06F 12/0862* (2013.01); *G06F 12/0811* (2013.01); *G06F 13/4027* (2013.01); *G06F 2212/1021* (2013.01); *G06F 2212/507* (2013.01); *G06F 2212/602* (2013.01)

(58) Field of Classification Search
CPC ............ G06F 12/0862; G06F 12/0811; G06F 13/4027; G06F 2212/1021; G06F 2212/507; G06F 2212/602
See application file for complete search history.

(56) References Cited

U.S. PATENT DOCUMENTS

| 6,438,656 B1 * | 8/2002 | Arimilli ................. G06F 9/383 711/137 |
| 7,962,724 B1 * | 6/2011 | Ali .......................... G06F 9/381 712/207 |
| 2009/0307433 A1 | 12/2009 | Jones et al. |
| 2014/0108729 A1 * | 4/2014 | Avudaiyappan .... G06F 12/0215 711/122 |
| 2014/0208039 A1 * | 7/2014 | Gilbert .................. G06F 9/3832 711/137 |

(Continued)

*Primary Examiner* — Hiep T Nguyen
(74) *Attorney, Agent, or Firm* — Renaissance IP Law Group LLP

(57) ABSTRACT

According to one general aspect, an apparatus may include a multi-tiered cache system that includes at least one upper cache tier relatively closer, hierarchically, to a processor and at least one lower cache tier relatively closer, hierarchically, to a system memory. The apparatus may include a memory interconnect circuit hierarchically between the multi-tiered cache system and the system memory. The apparatus may include a prefetcher circuit coupled with a lower cache tier of the multi-tiered cache system, and configured to issue a speculative prefetch request to the memory interconnect circuit for data to be placed into the lower cache tier. The memory interconnect circuit may be configured to cancel the speculative prefetch request if the data exists in an upper cache tier of the multi-tiered cache system.

20 Claims, 5 Drawing Sheets

(56) References Cited

U.S. PATENT DOCUMENTS

| | | |
|---|---|---|
| 2017/0235575 A1 | 8/2017 | Abdallah |
| 2018/0157591 A1 | 6/2018 | Wilkerson et al. |
| 2020/0081714 A1* | 3/2020 | Britto .................. G06F 12/0857 |

* cited by examiner

PREFETCHING IN A LOWER LEVEL EXCLUSIVE CACHE HIERARCHY

CROSS-REFERENCE TO RELATED APPLICATION

This application claims priority under 35 U.S.C. § 119 to Provisional Patent Application Ser. No. 62/865,954, entitled "PREFETCHING IN A LOWER LEVEL EXCLUSIVE CACHE HIERARCHY" filed on Jun. 24, 2019. The subject matter of this earlier filed application is hereby incorporated by reference.

TECHNICAL FIELD

This description relates to computer architecture, and more specifically to prefetching in a lower level exclusive cache hierarchy.

BACKGROUND

Generally, computers and the programs executed by them have a voracious appetite for unlimited amounts of fast memory. Unfortunately, memory (especially fast memory) is generally expensive both in terms of cost and die area. The traditional solution to the desire for unlimited, fast memory is a memory hierarchy or system of tiers or levels of memories. In general, the tiered memory system includes a plurality of levels of memories, each level slower but larger than the previous tier.

A typical computer memory hierarchy may include three levels. The fastest and smallest memory (often called a "Level 1 (L1) cache") is closest to the processor and includes static random access memory (RAM and SRAM). The next tier or level is often called a Level 2 (L2) cache, and is larger but slower than the L1 cache. The third level is the main memory and generally includes dynamic RAM (DRAM), often inserted into memory modules. However, other systems may have more or less memory tiers. Also, in some systems the processor registers and the permanent or semi-permanent storage devices (e.g., hard drives, solid state drives, etc.) may be considered part of the memory system.

The memory system generally makes use of a principle of inclusiveness, wherein the slowest but largest tier (e.g., main memory, etc.) includes all of the data available. The second tier (e.g., the L2 cache, etc.) includes a sub-set of that data, and the next tier from that (e.g., the L1 cache, etc.) includes a second sub-set of the second tier's subset of data, and so on. As such, all data included in a faster tier is also included by slower tier.

Generally, the caches decide what sub-set of data to include based upon the principle of locality (e.g., temporal locality, spatial locality, etc.). A program may wish to access data that it has either recently accessed or is next to the data it has recently accessed. For example, if a movie player program is accessing data, the movie player may want to access the next few seconds of the movie, and so on.

However, occasionally a program may request a piece of data that is not available in the fastest cache (e.g., the L1 cache, etc.). That is generally known as a "cache miss" and causes the fastest cache to request the data from the next memory tier (e.g., the L2 cache). This is costly to processor performance as a delay is incurred in determining that a cache miss has occurred, retrieving the data by the L1 cache, and providing it to the processor. Occasionally, the next tier of memory (e.g., the L2 cache, etc.) may not include the requested data and must request it from the next tier (e.g., main memory, etc.). This generally costs further delays.

SUMMARY

According to one general aspect, an apparatus may include a multi-tiered cache system that includes at least one upper cache tier relatively closer, hierarchically, to a processor and at least one lower cache tier relatively closer, hierarchically, to a system memory. The apparatus may include a memory interconnect circuit hierarchically between the multi-tiered cache system and the system memory. The apparatus may include a prefetcher circuit coupled with a lower cache tier of the multi-tiered cache system, and configured to issue a speculative prefetch request to the memory interconnect circuit for data to be placed into the lower cache tier. The memory interconnect circuit may be configured to cancel the speculative prefetch request if the data exists in an upper cache tier of the multi-tiered cache system.

According to another general aspect, an apparatus may include one or more processor cores. Each core may include a multi-tiered cache system that includes at least one upper cache tier relatively closer, hierarchically, to a core's executing unit and at least one lower cache tier relatively closer, hierarchically, to a system memory. Each core may include a prefetcher circuit coupled with a lower cache tier of the respective multi-tiered cache system, and configured to issue a speculative prefetch request for data, wherein for each request for data the respective multi-tiered cache system is a requesting respective multi-tiered cache system and the respective prefetcher circuit is a requesting prefetcher circuit. The apparatus may include a memory interconnect circuit, hierarchically between the processor cores and the system memory, wherein the memory interconnect circuit is configured to cancel the speculative prefetch request if the data exists in an upper cache tier of the requesting multi-tiered cache system.

According to another general aspect, a system may include a computer processor that includes one or more processor cores. Each core may include a multi-tiered cache system that includes at least one upper cache tier relatively closer, hierarchically, to a core's executing unit and at least one lower cache tier relatively closer, hierarchically, to a system memory. Each core may include a prefetcher circuit coupled with a lower cache tier of the respective multi-tiered cache system, and configured to issue a speculative prefetch request for data, wherein for each request for data the respective multi-tiered cache system is a requesting respective multi-tiered cache system and the respective prefetcher circuit is a requesting prefetcher circuit. The system may include a memory interconnect circuit, hierarchically between the processor cores and the system memory, wherein the memory interconnect circuit is configured to cancel the speculative prefetch request if the data exists in an upper cache tier of the requesting multi-tiered cache system. The system may include the system memory configured to store data.

The details of one or more implementations are set forth in the accompanying drawings and the description below. Other features will be apparent from the description and drawings, and from the claims.

A system and/or method for computer architecture, and more specifically to prefetching in a lower level exclusive cache hierarchy, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
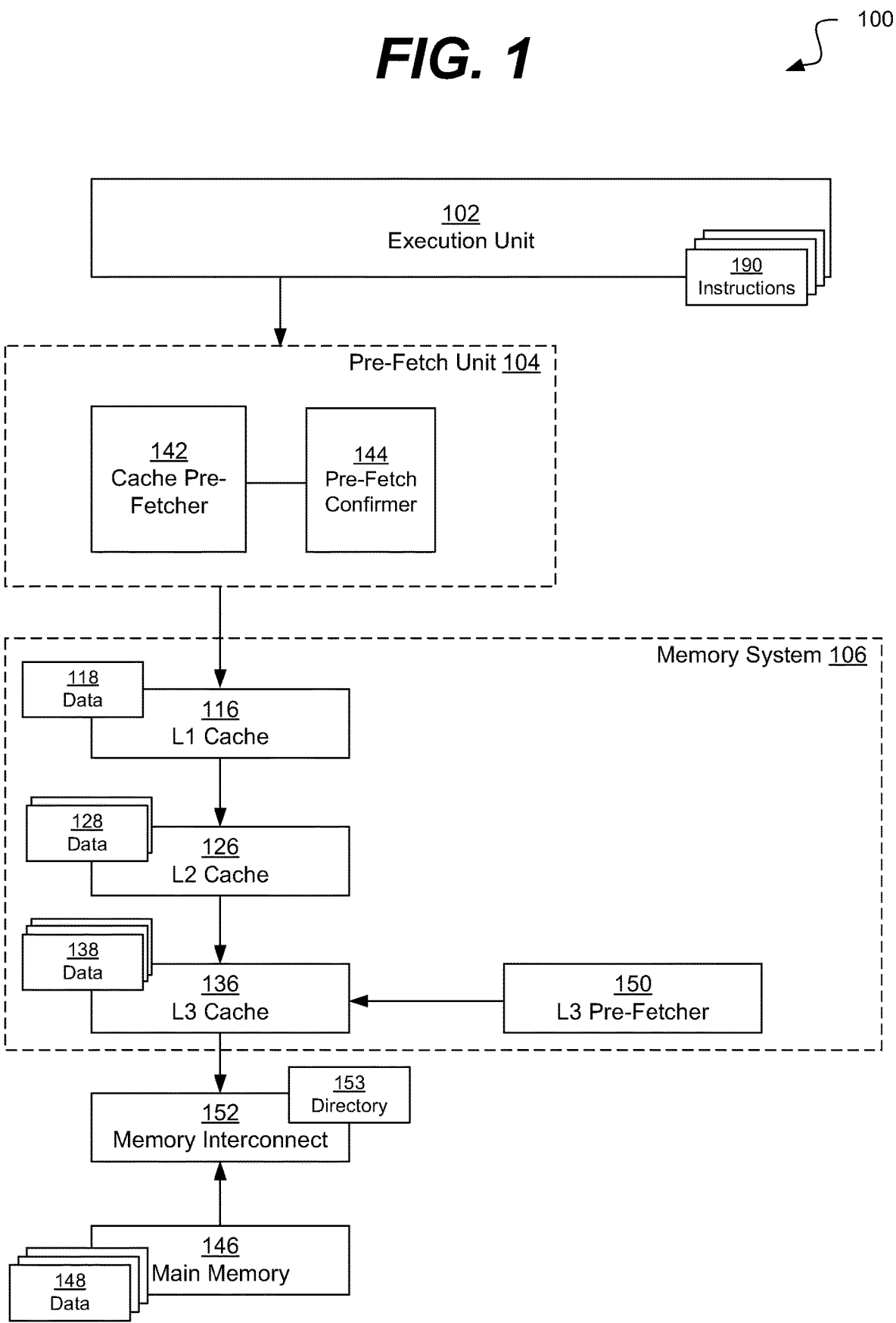
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a processor, such as for example, an integrate circuit (IC), a central processing unit (CPU), a graphics processing unit (GPU), a System-on-a-Chip (SoC), a controller processor, or other processor. In various embodiments, the system may be included by a computing device, such as, for example, a laptop, desktop, workstation, personal digital assistant, smartphone, tablet, and other appropriate computers or a virtual machine or virtual computing device thereof. It is understood that the above are merely a few illustrative examples to which the disclosed subject matter is not limited.

In various embodiments, the system 100 may include a multi-tier memory system 106 (e.g., level-1 (L1) cache 116, L2 cache 126, and L3 cache 136, etc.). It is understood that the above is merely one illustrative example to which the disclosed subject matter is not limited.

In various embodiments, the system 100 may include an execution unit 102 configured to execute or process one or more instructions 190. In such an embodiment, these instructions 190 may make up a program or application (or part thereof). In various embodiments, the execution unit 102 may be included by a processor or other larger computer component. In various embodiments, these instructions 190 may occasionally access (e.g., read from, write to, etc.) data stored in a memory system 106 and main memory 146.

In such an embodiment, when these instructions 190 access data, they may first request the data from the L1 cache 116, as the first, upper-most, or fastest tier of the memory system 106. In one such embodiment, the L1 cache 116 may store a sub-set of data 118. If the requested data is included in the data 118, the L1 cache 116 may supply the data (or update the stored data 118 in the case of a write instruction 190), and the execution unit 102 may proceed without incident.

However, in various embodiments, if the requested data is not included in the data 118 (i.e. a cache miss), the L1 cache 116 may, in turn, request the data from the L2 cache 126 (i.e. the next level or tier in the memory system 106). This may have a detrimental or undesired effect on the ability of the execution unit 102 to proceed and may cause the execution unit 102 to delay or stall the processing of the instructions 190.

Likewise, the L2 cache 126 may store a sub-set of data 128. If the cache-miss data is included in the data 128, the data may be supplied to the L1 cache 116 relatively forthwith. If not, another cache miss is generated, this time at the L2 cache 126 level. The L2 cache 126 may request the missing data from the L3 cache 136 (or next tier in the memory system 106) and, eventually as the process repeats, the main memory 146, and the main memory 146 is expected to have the data in its stored data 148. In various embodiments, the main memory 146 may only store a sub-set of data 148, and the entirety of possible data may be stored in a storage medium or other semi-permanent, or permanent memory device (e.g., hard drive, solid state device, optical disc, etc.), but that is not illustrated. It is understood that the above are merely a few illustrative examples to which the disclosed subject matter is not limited.

Cache misses are generally considered undesirable. In the illustrated embodiment, the system 100 may include a pre-fetch unit 104 configured to predict what data is likely to be requested by the instructions 190, and then cause that predicted data to be readily available in the memory system 106. In the illustrated embodiment, the pre-fetch unit 104 may reduce the number of cache misses directly caused by the instructions 190. In such an embodiment, by requesting data before the instruction 190 that needs (or is expected to need) the data is executed, a cache miss caused by requesting the data may be resolved by the time the instruction 190 needs the data. In such an embodiment, the execution unit 102 may not be aware that such a cache miss occurred, and may not stall or otherwise have its execution of the instructions 190 adversely affected. It is understood that the above is merely one illustrative example to which the disclosed subject matter is not limited.

In one embodiment, the cache pre-fetcher 142 may include a pattern identifier configured to detect a pattern of memory accesses that occur as a result of the instructions 190. In the illustrated embodiment, the pre-fetch unit 104 may include a pre-fetch confirmer 144 configured to determine if the cache pre-fetcher 142 correctly predicted what data would be asked for, and act as a feedback loop. It is understood that the above is merely one illustrative example to which the disclosed subject matter is not limited.

In the illustrated embodiment, the system 100 may include a stand-alone or separate pre-fetcher 150. In various embodiments, this pre-fetcher 150 may be coupled with a lower cache tier (e.g., the L3 cache 136). In such an embodiment, the stand-alone pre-fetcher 150 may be configured to pre-fetch data for a particular cache level or those below it. In such an embodiment, an upper level cache miss (e.g., in the L1 cache 116) may not flow all the way down to the system memory 146. In general, the cost in terms of time and power to request data from the system memory 146 is very high. By pre-fetching any anticipated data before the data request is made of the lower level cache (e.g., the L3 cache 136) the delay caused by going out the system memory 146 is hidden from the execution unit 102.

In various embodiments, the stand-alone pre-fetcher 150 may make predictions independently of the pre-fetch unit 104. In another embodiment, the pre-fetcher 150 may work in concert with the main pre-fetch unit 104. In yet another embodiment, stand-alone pre-fetcher 150 may work semi-independently in which it may utilize one or more of the data structures or circuits of the main pre-fetch unit 104, but the lower tier pre-fetcher 150 may not work at the direction of the main pre-fetch unit 104.

In the illustrated embodiment, once the lower tier pre-fetcher 150 determines that a certain piece of data is likely to be needed, it may issue a data request. The data request may be issued to the next lower tier (e.g., an L4 cache, not shown), or if there are no more cache tiers in the memory system 106, the memory interconnect 152. In some embodiments, the pre-fetcher 150 may make use of the data request circuits of the associated lower tier cache (e.g. the L3 cache 136's cache miss circuits) to make the request.

In such an embodiment, assuming no cache hits in any further lower cache tiers (e.g., an L4 cache, not shown), the data request may reach the system memory 146, and be returned and stored in the lower tier cache 136. Then, when the data is requested by the next higher cache tier (e.g., the L2 cache 126) it will be ready (a cache hit vs. a cache miss).

In such an embodiment, such a request to the system memory 146 may be superfluous, if the upper cache tiers (e.g., L1 and L2 caches 116 & 126) already include the requested data. In such an embodiment, the data may be needed by the execution unit 102, but since the L1 and L2 caches 116 & 126 can fulfill the request it would never be requested from the L3 cache 136. Hence, the time, bandwidth, and power used to access the system memory 146 would be wasted.

In systems where either the L3 cache or the L3 pre-fetcher 150 are aware of the contents of the upper level caches, the L3 pre-fetcher 150 may refrain from requesting any unneeded pre-fetched data. In another embodiment, the pre-fetcher 150 may the request but the L3 cache 136 may immediately fulfill the request (i.e., a cache hit). It is understood that the above are merely a few illustrative examples to which the disclosed subject matter is not limited.

However, in the illustrated embodiment, the lower tier cache (e.g., the L3 cache 136) and the lower tier pre-fetcher 150 may not be able to determine what data is stored in one or more of the upper tier caches. In one embodiment, the L3 cache 136 may include an exclusive cache. In this context, an exclusive cache is one that does not include the data (e.g., data 118 or 128) from one or more of the upper tiered caches (e.g., L1 or L2 caches 116 & 126). In such an embodiment, the L3 cache 136 may not include or know what data is in the upper tiered caches 116 & 126. It is understood that the above is merely one illustrative example to which the disclosed subject matter is not limited.

In the illustrated embodiment, the system 100 may include a memory interconnect circuit or coherent memory interconnect 152. The memory interconnect 152 may include a directory 153 that details the state of the data in the cache system 106. In various embodiments, the coherent memory interconnect 152 may be configured to provide cache coherence between multiple cache systems 106 (see FIG. 2), and as such may use the directory 153 to provide that service (e.g., the MESI protocol, etc.). In various embodiments, the directory 153 may include a snoop filter directory.

In the illustrated embodiment, the stand-alone pre-fetcher 150 may be configured to issue a speculative read request, instead of a normal unconditional read request. In such an embodiment, the speculative read request may be cancelled or squashed if the requested data is available via a more efficient operation.

In some embodiments, the speculative read request may indicate its speculative nature via a flag, bit, or field in the read request itself, by a special command, or by a special protocol. It is understood that the above are merely a few illustrative examples to which the disclosed subject matter is not limited.

In such an embodiment, the pre-fetcher 150 may issue the speculative read request. When the speculative read request is received by the memory interconnect 152, the memory interconnect 152 may determine if the requested data is available within the rest of the memory system 106. In the illustrated embodiment, do make this determination the memory interconnect 152 may examine its snoop filter directory 153 that includes metadata regarding the contents 118, 128, and 138 of the memory system 106, which the pre-fetcher 150 cannot see.

In such an embodiment, if the requested data may be found in an upper tier of the cache system 106 (e.g., caches 116 or 126), the memory interconnect 152 may cancel or squash the speculative read request and not forward it to the system memory 146. In such an embodiment, the time, bandwidth, and power used to access the system memory 146 may be spared. Further, it is likely that any version of the requested data in the system memory 146 might be stale as the versions in the upper cache tiers 116 or 126 may have been written to recently.

In one embodiment, the memory interconnect 152 may return a cancelled read response message to the pre-fetcher 150 to indicate that the speculative read request has been cancelled. Again, in various embodiments, the response message may indicate cancellation and/or of which particular request via a flag, bit, or field in the read response itself, by a special command, or by a special protocol.

In another embodiment, if the requested data may be found in an upper tier of the cache system 106 (e.g., caches 116 or 126), the memory interconnect 152 may forward the read request to the system memory 146 (possible re-formatting it). The system memory 146 may respond with the requested data, which may be entered into the lower tiered cache 136. From there, when requested by the execution unit 102, the requested data may be used.

In various embodiments, the directory 153 may only have knowledge of data that may potentially be in the cache system 106. In one such an embodiment, the directory may be allowed to be pessimistic in predicting if data is present in the cache system 106, but never optimistic. That is to say, the directory 153 may indicate that data is present in the cache system 106 when it is not (false positive), but not that data is not in the cache system 106 when it is (false negative).

In such an embodiment, if the memory interconnect 153 incorrectly cancels the speculative pre-fetch (read request), the requested data may not be available in the L3 cache 136 when asked for by the L2 cache 126. In such an embodiment, the L2 cache 126's read request for the data may eventually flow down to the system memory 146. This may take more time than desired, but will still get the requested data.

Conversely, if the memory interconnect 153 incorrectly allows and fulfills the speculative pre-fetch (read request), unwanted data may pollute the lower tier cache 136 and time, bandwidth, and power may be wasted accessing the system memory 146. In various embodiments, the trade offs between the two alternatives may be weighted and balanced according to the wishes of the system 100.

In various embodiments, the memory interconnect 152 may be configured to cancel a speculative read request for other reasons. In one embodiment, the memory interconnect 152 may detect another or duplicate read request for the same data (e.g., from various cache misses), and cancel the speculative read request. It is understood that the above is merely one illustrative example to which the disclosed subject matter is not limited.

Figure 2:
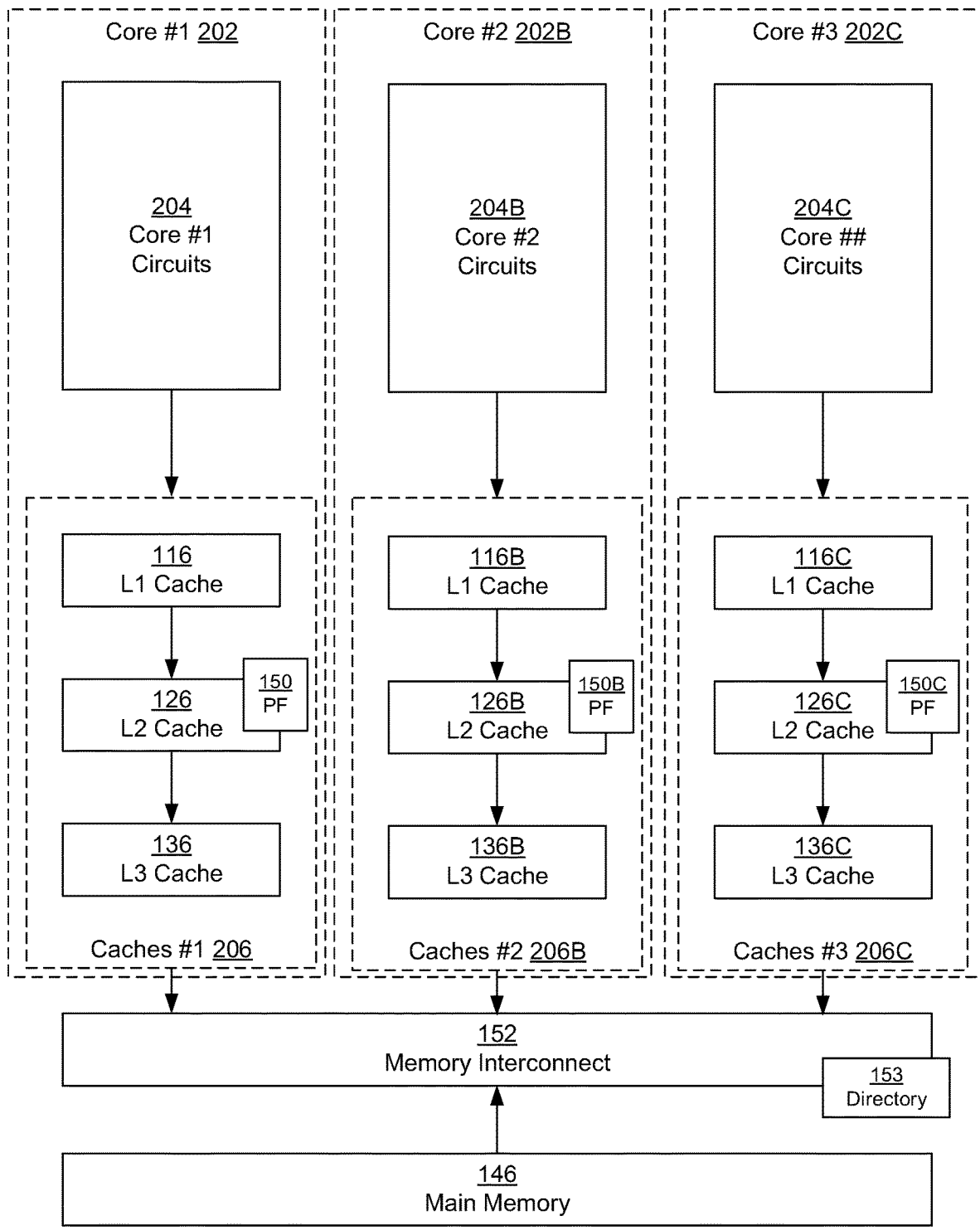
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a multi-core processor. In general, a multi-core processor is a computer processor integrated circuit with two or more separate processing units, called cores, which each read and execute program instructions, as if the computer had several processors.

In the illustrated embodiment, each core 202 includes a series of core circuits 204 (which include execution units, as described above), and a tiered cache system 206. In the illustrated embodiment, three cores 204, 204B, and 204C are shown, although cores usually occur in powers of two (e.g., 4, 8, 16, etc.). In the illustrated embodiment, each core 204 is shown as being identical, but in some embodiments, differences may exist between the cores (e.g., cache sizes, processing focus, etc.).

As described above, each cache system 206 (and 206B and 206C) may include multiple cache tiers 116, 126, 136, (and 116B, 126B, 136B, 116C, 126C, and 136C). While 3 cache tiers are shown the disclosed subject matter may work for any system 206 with two or more tiers.

While FIG. 1 showed a pre-fetcher circuit 150 associated with the lowest cache tier 136, FIG. 2 illustrates that the pre-fetcher 150 may be associated with any lower tier cache (e.g., cache 126).

In such an embodiment, the pre-fetcher 105 may issue the speculative read request. The next lower cache tier, in this case the L3 cache 136, may process the read request. If a cache-hit occurs, the read request may be fulfilled and the processing may end with its storage in the requesting cache (L2 cache 126). If a cache-miss occurs, the read request, along with an indication of its speculative nature, may be forwarded to the memory interconnect 152.

As described above, the memory interconnect 152 may include a snoop filter directory or other data structure 153 that stores metadata related to the core's cache systems 206, 206B, and 206C. In various embodiments, the directory 153 may store information about what data is in all of the cache systems 206, 206B, and 206C. In such an embodiment, it may be possible for the memory interconnect 152 to know if the requesting data is stored by another core's cache system. For example, if the speculative read request comes from the 1$^{st}$ core's pre-fetcher 150, the memory interconnect 152 may note if the requested data is stored in the 3$^{rd}$ core's L2 cache 126C.

In one embodiment, the memory interconnect 152 may be configured to ignore the existence of the requested data in any cache system, but the requesting core's cache system. Continuing the example above, the memory interconnect 152 may either only check if the requesting data is in the caches 116 and 126, or the memory interconnect 152 may consider the requested data to not be present despite being stored in the L2 cache 126C (of a non-requesting core).

In such an embodiment, the memory interconnect 152 may forward the read request to the system memory 146, and return the requested data to the L3 cache 136. In another embodiment, the protocol for fulfilling a read request may include requesting the data from the other core (e.g., core 202C). In such an embodiment, the memory interconnect 152, depending upon the coherency state, may request that the data from the storing L2 cache 126C be written back to the system memory 146 (or at least as far as the memory interconnect 152, and then the refreshed version of the requested data may be written to the L3 cache 136. In various embodiments, the protocol for fulfilling the read request may be based upon cache coherency concerns.

Figure 3:
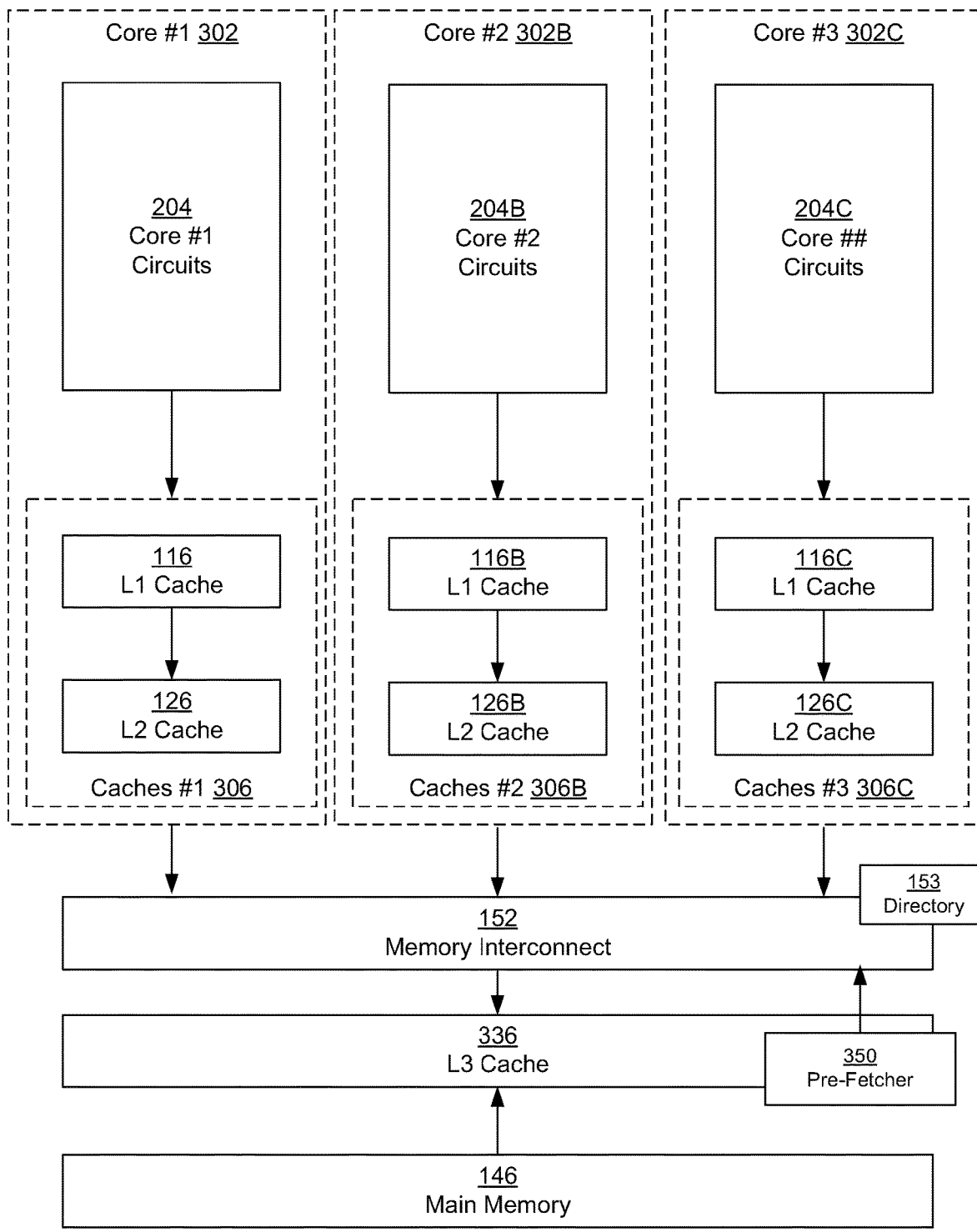
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include a multi-core processor, as described above. In the illustrated embodiment, the multiple cores may share a lower level cache 336.

As described above, in the illustrated embodiment, each core 302 includes a series of core circuits 204 (which include execution units, as described above), and a tiered cache system 306. As described above, each cache system 306 (and 206B and 206C) may include multiple cache tiers 116, and 126 (and 116B, 126B, 116C, and 126C). While 2 cache tiers are shown the disclosed subject matter may work for any system 306 with two or more tiers.

In the illustrated embodiment, an additional cache is shown, the shared low level L3 cache 336. In such an embodiment, this cache 336 may be shared amongst the cores 302. In the illustrated embodiment, it may be separated from the cores 302 by the memory interconnect 152, which may be configured to maintain cache coherence between the three cache system 306, 306B, and 306C.

In the illustrated embodiment, the shared lower tier cache 336 may be associated with its own pre-fetcher 350, similarly to that described above. Likewise, the shared lower tier cache 336 may not have visibility into the storage contents of the cache system caches 116, 126, 116B, 126B, 116C, and 126C.

In such an embodiment, the pre-fetcher 350 may issue the speculative read request to the memory interconnect 152. As described above, the memory interconnect 152 may examine the directory 153 and determine if the requested data is already present in the cache systems 306, 306B, or 306C. In such an embodiment, if it is, the memory interconnect 152 may initiate a write back to write the requested data from the storing cache system (e.g., cache 126C) to the shared lower tier cache 336. If the requested data, is not there the memory interconnect 152 may initiate a read request from the system memory 146 to the shared lower tier cache 336.

In various embodiments, the speculative read request may include an indication of which core 302 the pre-fetcher 350 thinks the requested data will be used by. In such an embodiment, if the requested data is already in that core's cache system (e.g., requested for core 204B and in cache 116B), the memory interconnect 152 may cancel the read request, as described above. Conversely, if the requested data is not in that core's cache system (e.g., requested for core 204B but in cache 116C), the memory interconnect 152 may fulfill the read request from either the system memory 146 or other cache, as described above.

In one embodiment, prior to issuing a speculative read request, the pre-fetcher 350 may communicate with the memory interconnect 152 and determine if and where the -to-be requested data is stored. In such an embodiment, if the speculative read request would be cancelled (e.g., the to-be requested data is already stored in a higher tiered cache), the pre-fetcher 350 may refrain from ever issuing the read request. Alternatively, if the pre-fetcher 350 is informed that the speculative read request would be allowed, the pre-fetcher 350 may issue a non-speculative read request. It is understood that the above is merely one illustrative example to which the disclosed subject matter is not limited.

Further, the system 300 of FIG. 3 shows that in the other embodiments systems may include tiers of memories that are generally represented by the block labeled main or system memory 146. In such an embodiment, these intermediate tiers may not include pre-fetchers as shown in FIG. 3.

Figure 4:
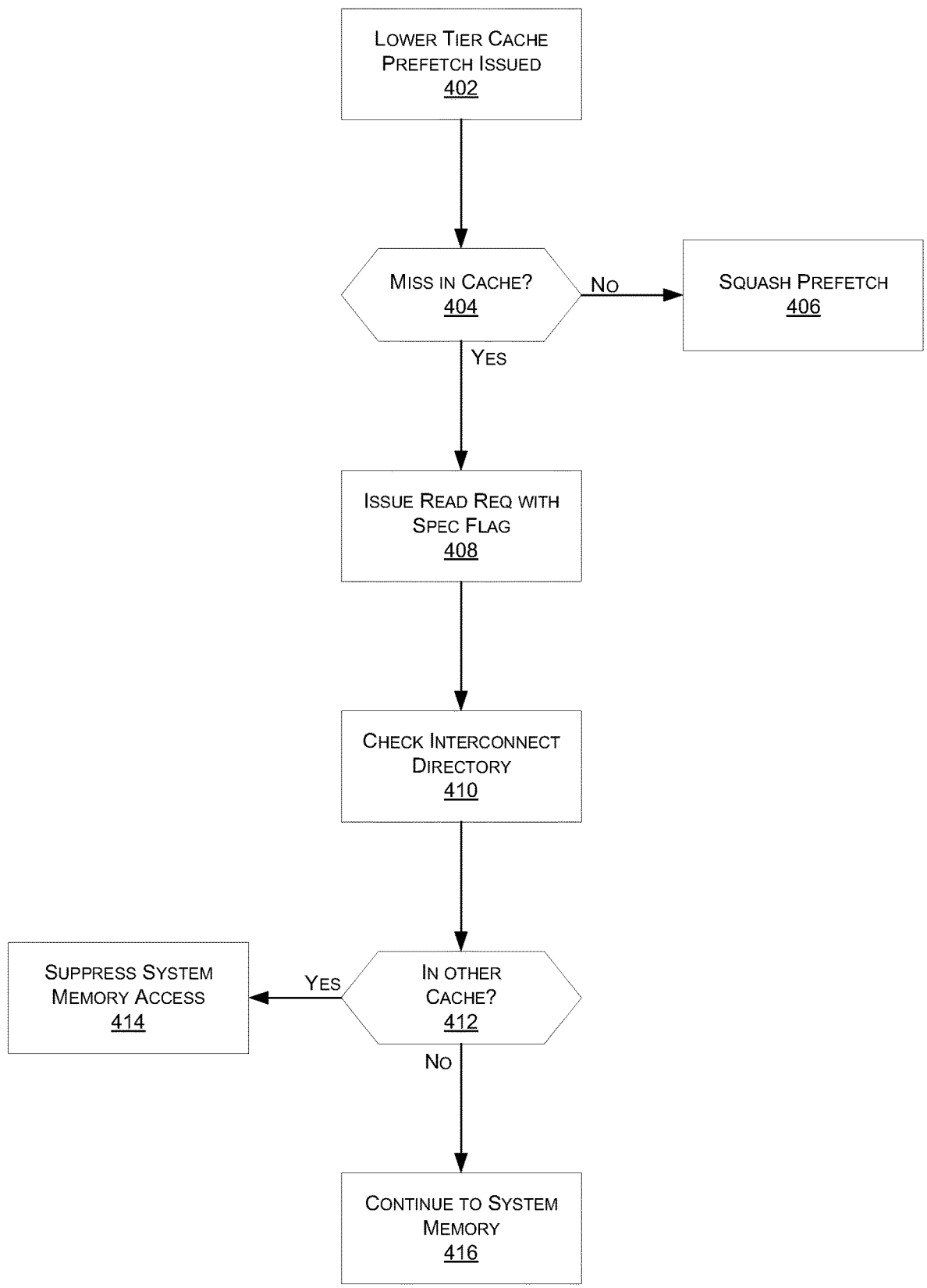
FIG. 4 is a flowchart of an example embodiment of a technique in accordance with the disclosed subject matter.

FIG. 4 is a flowchart of an example embodiment of a technique in accordance with the disclosed subject matter. In various embodiments, the technique 400 may be used or produced by the systems such as those of FIG. 1, 2, or 3. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a pre-fetch request for a lower tier cache may be issued, as described above. In the illustrated embodiment, the request may first be sent to the lower tier cache itself. In such an embodiment, the request may not be the speculative read request, but an informative request. It is understood that the above are merely a few illustrative examples to which the disclosed subject matter is not limited.

Block 404 illustrates that, in one embodiment, the lower tier cache may determine if the requested data is the lower tier cache. Block 406 illustrates that, in one embodiment, if the data is in the lower tier cache (a cache hit) the pre-fetch request may be terminated or squashed, as unnecessary. It is understood that the above are merely a few illustrative examples to which the disclosed subject matter is not limited.

Block 408 illustrates that, in one embodiment, if the data is not in the lower tier cache (cache miss), the pre-fetcher may issue a speculative read request to the memory interconnect, as described above. In various embodiments, the speculative read request may include a flag, bit, field or other indicator of the speculative nature of the request, as described above.

Blocks 410 and 412 illustrate that, in one embodiment, the memory interconnect may determine if the requested data is in another (higher or upper) tier of the cache system, as described above. In such an embodiment, the determination may involve a snoop filter directory, or other data structure, as described above. It is understood that the above are merely a few illustrative examples to which the disclosed subject matter is not limited.

Block 414 illustrates that, in one embodiment, if the requested data is stored in another cache, the speculative ready request may be cancelled or suppressed, as described above. Block 416 illustrates that, in one embodiment, if the requested data is not stored in another cache, the speculative ready request may be forwarded or continue towards the system memory, as described above. It is understood that the above are merely a few illustrative examples to which the disclosed subject matter is not limited.

Figure 5:
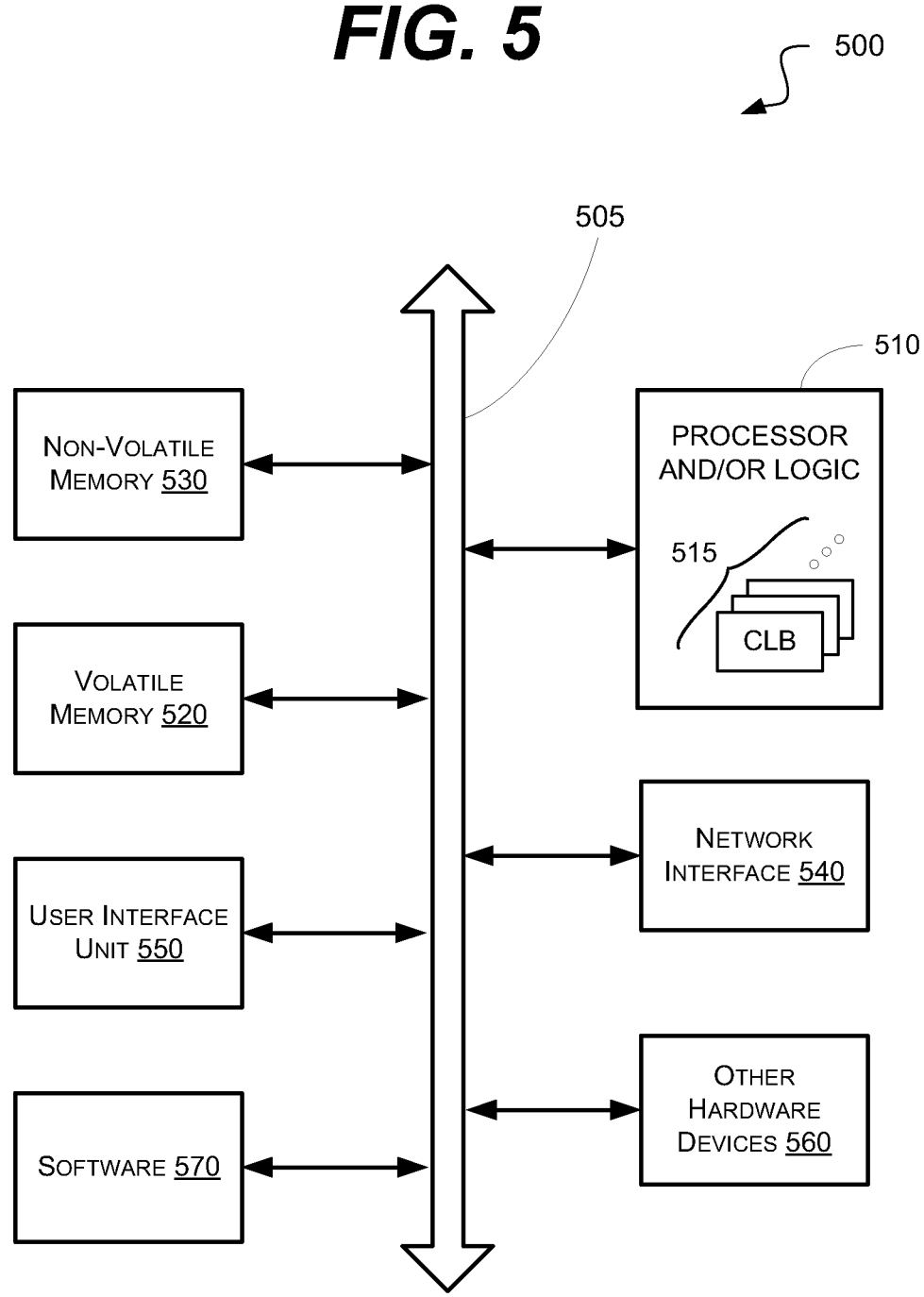
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM)). The information processing system 500 according to the disclosed subject matter may further include a non-volatile memory 530 (e.g., a hard drive, an optical memory, a NAND or Flash memory). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 500 according to the disclosed subject matter may further include a user interface unit 550 (e.g., a display adapter, a haptic interface, a human interface device). In various embodiments, this user interface unit 550 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540) of the information processing system 500. In such an embodiment, the information processing system 500 may include one or more native applications, which may be installed locally (e.g., within the non-volatile memory 530) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
    a multi-tiered cache system, comprising at least one upper cache tier relatively closer, hierarchically, to a processor and at least one lower cache tier relatively closer, hierarchically, to a system memory;
    a memory interconnect circuit hierarchically between the multi-tiered cache system and the system memory; and
    a prefetcher circuit coupled with a lower cache tier of the multi-tiered cache system, and configured to issue a speculative prefetch request to the memory interconnect circuit for data to be placed into the lower cache tier, and
    wherein the memory interconnect circuit is configured to cancel the speculative prefetch request if the data exists in an upper cache tier of the multi-tiered cache system.

2. The apparatus of claim 1, wherein the lower cache tier is an exclusive cache.

3. The apparatus of claim 1, wherein the memory interconnect circuit comprises a snoop filter directory, and wherein the memory interconnect circuit is configured to determine if the data exists in an upper cache tier of the multi-tiered cache system based, at least in part, upon the snoop filter directory.

4. The apparatus of claim 1, wherein the memory interconnect circuit is configured to transmit a cancelled prefetch response to the prefetcher circuit if the speculative prefetch request is cancelled.

5. The apparatus of claim 1, wherein the memory interconnect circuit is configured to cancel the speculative prefetch request if the speculative prefetch request is duplicative of another request for the data.

6. The apparatus of claim 1, wherein the apparatus includes a primary prefetcher circuit coupled with an upper cache tier, and wherein the primary prefetcher circuit is configured to issue non-speculative prefetch requests to at least the multi-tiered cache system and, if unfulfilled by the multi-tier cache system, through to the system memory.

7. The apparatus of claim 1, wherein the prefetcher circuit is configured to not have visibility into the contents of an upper cache tier, such that the prefetcher circuit is unaware whether the data is stored in the upper cache tier before issuing the speculative prefetch request.

8. The apparatus of claim 1, wherein the multi-tier cache system comprises a first and a second upper cache tiers, and a third lower cache tier.

9. The apparatus of claim 1, wherein the memory interconnect circuit is configured to cancel the speculative prefetch request before the speculative prefetch is forwarded to the system memory.

10. An apparatus comprising:
    one or more processor cores, wherein each core comprises:
        a multi-tiered cache system, comprising at least one upper cache tier relatively closer, hierarchically, to a core's executing unit and at least one lower cache tier relatively closer, hierarchically, to a system memory, and
        a prefetcher circuit coupled with a lower cache tier of the respective multi-tiered cache system, and configured to issue a speculative prefetch request for data, wherein for each request for data the respective multi-tiered cache system is a requesting respective multi-tiered cache system and the respective prefetcher circuit is a requesting prefetcher circuit; and a memory interconnect circuit, hierarchically between the processor cores and the system memory, wherein the memory interconnect circuit is configured to cancel the speculative prefetch request if the data exists in an upper cache tier of the requesting multi-tiered cache system.

11. The apparatus of claim 10, wherein the lower cache tier is an exclusive cache.

12. The apparatus of claim 10, wherein the memory interconnect circuit comprises a snoop filter directory, and wherein the memory interconnect circuit is configured to determine if the data exists in an upper cache tier of the requesting multi-tiered cache system based, at least in part, upon the snoop filter directory.

13. The apparatus of claim 10, wherein the memory interconnect circuit is configured to transmit a cancelled prefetch response to the prefetcher circuit if the speculative prefetch request is cancelled.

14. The apparatus of claim 10, wherein the memory interconnect circuit is configured to cancel the speculative prefetch request if the speculative prefetch request is duplicative of another request for the data.

15. The apparatus of claim 10, wherein each processor core includes a primary prefetcher circuit coupled with an upper cache tier, and wherein the primary prefetcher circuit is configured to issue non-speculative prefetch requests to at least the multi-tiered cache system and, if unfulfilled by the multi-tier cache system, through to the system memory.

16. The apparatus of claim 10, wherein the prefetcher circuit is configured to not have viability into the contents of an upper cache tier, such that the prefetcher circuit is unaware whether the data is stored in the upper cache tier before issuing the speculative prefetch request.

17. The apparatus of claim 10, wherein each multi-tier cache system comprises a first and a second upper cache tiers, and a third lower cache tier.

18. The apparatus of claim 10, wherein the memory interconnect circuit is configured to cancel the speculative prefetch request before the speculative prefetch is forwarded to the system memory.

19. A system comprising:
a computer processor, comprising one or more processor cores, wherein each core comprises:
a multi-tiered cache system, comprising at least one upper cache tier relatively closer, hierarchically, to a core's executing unit and at least one lower cache tier relatively closer, hierarchically, to a system memory, and
a prefetcher circuit coupled with a lower cache tier of the respective multi-tiered cache system, and configured to issue a speculative prefetch request for data, wherein for each request for data the respective multi-tiered cache system is a requesting respective multi-tiered cache system and the respective prefetcher circuit is a requesting prefetcher circuit;
a memory interconnect circuit, hierarchically between the processor cores and the system memory, wherein the memory interconnect circuit is configured to cancel the speculative prefetch request if the data exists in an upper cache tier of the requesting multi-tiered cache system; and
the system memory configured to store data.

20. The apparatus of claim 19, wherein the memory interconnect circuit comprises a snoop filter directory, and wherein the memory interconnect circuit is configured to determine if the data exists in an upper cache tier of the requesting multi-tiered cache system based, at least in part, upon the snoop filter directory.

* * * * *